(12) United States Patent
Narasimha et al.

(10) Patent No.: US 9,807,633 B2
(45) Date of Patent: Oct. 31, 2017

(54) CONFIGURING UNSCHEDULED PERIODS TO ENABLE INTERFERENCE REDUCTION IN HETEROGENEOUS NETWORKS

(75) Inventors: Murali Narasimha, Lake Zurich, IL (US); Sandeep H. Krishnamurthy, Sunnyvale, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1150 days.

(21) Appl. No.: 13/288,829

(22) Filed: Nov. 3, 2011

(65) Prior Publication Data
US 2012/0113847 A1    May 10, 2012

Related U.S. Application Data

(60) Provisional application No. 61/410,847, filed on Nov. 5, 2010.

(51) Int. Cl.
| H04W 24/10 | (2009.01) |
| H04W 16/32 | (2009.01) |
| H04L 12/24 | (2006.01) |

(52) U.S. Cl.
CPC ......... *H04W 24/10* (2013.01); *H04L 41/0869* (2013.01); *H04W 16/32* (2013.01)

(58) Field of Classification Search
CPC .... H04W 24/10; H04W 16/32; H04L 41/0869
See application file for complete search history.

(56) References Cited

U.S. PATENT DOCUMENTS

| 9,380,481 | B2 | 6/2016 | Narasimha et al. |
| 2005/0032542 | A1 | 2/2005 | Wilborn et al. |
| 2005/0197132 | A1* | 9/2005 | Lee ........................ H04L 5/0062 455/450 |
| 2006/0172733 | A1 | 8/2006 | Benco et al. |
| 2006/0183429 | A1 | 8/2006 | Anderson |
| 2007/0053318 | A1 | 3/2007 | Proctor et al. |

(Continued)

FOREIGN PATENT DOCUMENTS

| CN | 101352080 A | 1/2009 |
| CN | 101557596 A | 10/2009 |

(Continued)

OTHER PUBLICATIONS

Patent Cooperation Treaty, International Search Report and Written Opinion of the International Searching Authority for International Application No. PCT/US2011/059407, Dec. 27, 2011, 19 pages.

(Continued)

*Primary Examiner* — Walter Divito
(74) *Attorney, Agent, or Firm* — Faegre Baker Daniels LLP

(57) ABSTRACT

A mobile station in a wireless communication network is disclosed. The mobile station includes a transceiver coupled to a processor configured to perform measurements of signals of one or more cells of a wireless communication system during a first set of subframes, to cause the transceiver to transmit a measurement report including at least the measurements of signals of the one or more cells, and to indicate that the measurements of the one or more cells were performed during the first set of subframes.

8 Claims, 7 Drawing Sheets

(56) References Cited

U.S. PATENT DOCUMENTS

| | | | |
|---|---|---|---|
| 2009/0075690 A1 | 3/2009 | Roberts et al. | |
| 2010/0034101 A1 | 2/2010 | Ayman Naguib | |
| 2011/0194632 A1 | 8/2011 | Clerckx et al. | |
| 2011/0256833 A1* | 10/2011 | Racz | H04W 24/08 455/63.1 |
| 2011/0319025 A1* | 12/2011 | Siomina | H04B 7/024 455/63.1 |
| 2012/0250636 A1* | 10/2012 | Wang et al. | 370/329 |

FOREIGN PATENT DOCUMENTS

| | | |
|---|---|---|
| CN | 101800935 A | 8/2010 |
| WO | 2007050729 A1 | 5/2007 |
| WO | 2010021507 A2 | 2/2010 |
| WO | 2010093156 A2 | 8/2010 |

OTHER PUBLICATIONS

RAN1: iILS on time-domain extension of Rel 8/9 backhaul-based ICIC for Macro-Pico scenario, 3GPP DRAFT; R2-105991 R1-105793, 3rd Generation Partnership Project (3GPP), Mobile Competence Centre; 650, Route Des Lucioles; F-06921 Sophia-Antipolis Cedex; France, vol. RAN WG2, No. Xi Ian; Oct. 11, 2010, all pages.

Narasimha et al., "Configuring Unscheduled Period to Enable Interference Reduction in Heterogeneous Networks" U.S. Appl. No. 13/289,432, filed Nov. 4, 2011, 32 pages.

Patent Cooperation Treaty, "PCT Search Report and Written Opinion of the International Searching Authority" for International Application No. PCT/US2011/059409 Jan. 16, 2012, 15 pages.

3GPP TSG RAN WG1 Meeting #62bis, R1-105551 "TDM eICIC coordination between macro eNBs and CSG Home eNBS" Nokia Siemens Networks, Nokia, Oct. 11-15, 2010, Xi'an, China, 6 pages.

3GPP TSG RAN WG2 Meeting #72, R2-106332, "Discussion on measurement restriction of eICIC" ZTE, Jacksonville, United States, Nov. 15-19, 2010, 6 pages.

3GPP TSG RAN WG3 Meeting #70bis, R3-110163 "More on resource status report for eICIC" Qualcomm Incorporated, Dublin, Ireland Jan. 17-21, 2011, 2 pages.

3GPP TSG RAN WG2 Meeting #71bis, R2-105360 "Resource Participation and Measurement for eICIC" ZTE, Oct. 11-15, 2010. Xi'an, China, 7 pages.

3GPP TSG RAN WG2 Meeting #71bis, R2-105593 Change Request "Introduction of Enhanced ICIC" Qualcomm Incorporated, Oct. 11-15, 2010, Zian, China, 5 pages.

3GPP TSG RAN WG2 Meeting #71bis, R2-105786 "eICIC: Idle Mode Considerations" Qualcomm Incorporated, Oct. 11-15, 2010, Xi'an, China, 2 pages.

3GPP TSG RAN WG2 Meeting #71bis, R2-105467 "RRC Impact of eICIC" Nokian Siemens Network, Oct. 11-15, 2010, Xi'an, China, 5 pages.

3GPP TSG RAN WG2 Meeting #72bis, R2-110053 "Email discussion [72#33] : time domain ICIC "Pattern2" details" Qualcomm Inc., Jan. 17-21, 2011, Dublin, Ireland, 12 pages.

3GPP TSG RAN WG2 Meeting #72bis, R2-110329 "Measurement Restrictions for eICIC" Motorola Mobility, Jan. 17-21, 2011, Dublin, Ireland, 4 pages.

Korean Patent Office; Notice of Preliminary Rejection; Korean Patent Application No. 10-2015-7011479; dated Jun. 2, 2015.

European Patent Office; EP Office Action; EP Application No. 11785237.6; dated Jun. 24, 2016.

European Patent Office; EP Office Action; EP Application No. 11785238.4; dated Jun. 24, 2016.

Korean Patent Office; Final Rejection in Korean Patent Application No. 10-2013-7011639 dated Jan. 7, 2015.

Korean Patent Office; 2nd Final Rejection in Korean Patent Application No. 10-2013-7011639 dated Mar. 2, 2015.

Korean Patent Office; Notice of Preliminary Rejection in Korean Patent Application No. 10-2013-7011639 dated Jul. 25, 2014.

Korean Patent Office; Notice of Preliminary Rejection in Korean Patent Application No. 10-2015-7011599 dated Jun. 2, 2015.

U.S. Patent and Trademark Office; Non-Final Rejection; U.S. Appl. No. 13/289,432; dated Dec. 19, 2013.

U.S. Patent and Trademark Office; Final Rejection; U.S. Appl. No. 13/289,432; dated Jul. 2, 2014.

The State Intellectual Property Office of the People's Republic of China; CN First Office Action; CN Application No. 201180053446.5; dated Oct. 30, 2015.

The State Intellectual Property Office of the People's Republic of China; CN First Office Action; CN Application No. 201180053437.6; dated May 20, 2015.

Korean Patent Office; Notice of Preliminary Rejection in Korean Patent Application No. 10-2013-7011607; dated Jul. 25, 2014.

Korean Patent Office; 2, 2016. Notice of Preliminary Rejection in Korean Patent Application No. Oct. 2016-7007792; dated Jun.

Korean Patent Office; Notice of Final Rejection in Korean Patent Application No. 10-2013-7011607; dated Feb. 7, 2015.

Korean Patent Office; Notice of Second Final Rejection in Korean Patent Application No. 10-2013-7011607; dated Apr. 2, 2015.

3GPP TSG RAN WG1 Meeting #62bis, R1-105406 "Support of Time Domain ICIC in Rel-10," Oct. 11-15, 2010.

3GPP, 3rd Generation Partnership Project; Technical Specification Group Radio Access Network; Evolved Universal Terrestrial Radio Access (E-UTRA); Radio Resource Control (RRC); Protocol Specification (Release 9), 3GPP TS 36.331 V9.4.0, Sep. 2010.

* cited by examiner

CONFIGURING UNSCHEDULED PERIODS TO ENABLE INTERFERENCE REDUCTION IN HETEROGENEOUS NETWORKS

CROSS-REFERENCE TO RELATED APPLICATIONS

The present application claims benefits under 35 U.S.C. 119(e) from U.S. provisional Application No. 61/410,847 filed on 5 Nov. 2011, the contents of which are incorporated herein by reference.

FIELD OF THE DISCLOSURE

The present disclosure relates generally to wireless communications, interference management and interference reduction in wireless networks.

BACKGROUND

Heterogeneous networks comprise a variety of base stations serving mobile stations. In some systems, the base stations operate on the same carrier frequency. The variety of base stations can include some or all of the following types of base stations: conventional macro base stations (macro cells), pico base station (pico cells), relay nodes and femto base stations (also referred to as femto cells, closed subscriber group (CSG) cells or Home eNodeBs). Macro cells typically have coverage areas that range from several hundreds of meters to several kilometers. Pico cells, relays and femto cells can have coverage areas that are considerably smaller than the coverage area of typical macro cells. Pico cells can have coverage areas of about 100-200 meters. Femto cells are typically used for indoor coverage, and can have coverage areas in the 10 s of meters. Relay nodes are characterized by a wireless backhaul to a donor base station, and can have coverage areas similar to pico cells.

Heterogeneous networks can potentially enable an operator to provide improved service to users (e.g., increased data rates, faster access, etc.) with lower capital expenditure. Typically, installation of macro base stations is very expensive as they require towers. On the other hand, base stations with smaller coverage areas are generally much less expensive to install. For example, pico cells can be installed on roof tops and femto cells can be easily installed indoors. The pico and femto cells allow the network to offload user communication traffic from the macro cell to the pico or femto cells. This enables users to get higher throughput and better service without the network operator installing additional macro base stations or provisioning more carrier frequencies for communication. Thus, heterogeneous networks are considered to be an attractive path for evolution of wireless communication networks. 3GPP has commenced work on enabling heterogeneous LTE networks in 3GPP LTE Release 10.

FIG. 1 illustrates an LTE Heterogeneous network comprising a macro cell, pico cells and femto cells operating on a single carrier frequency. A mobile station, also referred to as "user equipment" (UE), may be associated with one of the cells based on its location. The association of a UE to a cell can refer to association in idle mode or connected mode. That is, a UE is considered to be associated with a cell in idle mode if it is camped on the cell in idle mode. Similarly, a UE is considered to be associated with a cell in connected mode if it is configured to perform bi-directional communication with a cell (for example, a UE in LTE radio resource control (RRC) connected mode can be connected to and therefore associate with a cell). A UE associated with a macro cell is referred to macro UE, a UE associated with a pico cell is referred to as a pico UE, and a UE associated with a femto cell is referred to as a femto UE.

Various time-division approaches are possible for ensuring that base stations in heterogeneous networks share the frequency spectrum while minimizing interference. Two approaches can be envisioned. A network can configure time periods when different base stations are required to not transmit. This enables cells that can interfere with one another to transmit in mutually exclusive time periods. For example, a femto cell can be configured with some time periods during which it does not transmit. If a macro UE is located within the coverage of the femto cell, the macro cell can use the time periods during which the femto cell does not transmit data to the UE.

The network can configure time periods where a first base station transmits on all available time periods (e.g., pico eNBs), while a second base station (e.g., macro eNB) transmits only on a subset of the available time periods. A UE connected to the first base station can therefore have two "virtual" channels at different channel qualities depending on how much the second base station's transmission interferes with that for the first (i.e., signal geometry of the first base station relative to the second). The first virtual channel is where only the first base station transmits data while the second base station does not transmit data. The second virtual channel is one where both the first and the second base stations transmit data. The first base station can use adaptive modulation and coding and schedule at different modulation coding scheme (MCS) levels on two virtual channels. In the extreme case, the first base station may not schedule at all on the second virtual channel when interference from the second base station is large.

However, it should be noted that time division approaches can lead to inaccurate or inconsistent radio resource management (RRM) measurements, RLM measurements and channel state information (CSI) measurements. For example, if a macro UE located near a femto cell performs measurements during time periods when the femto cell transmits, the measured values can be significantly different from measured values obtained from measurements made during time periods when the femto cell does not transmit. Such measurements can lead to erratic behaviors, such as failed connections, unnecessary handovers and unnecessary cell reselections. Therefore, methods are needed for performing measurements of cells that overcome the problems mentioned above.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
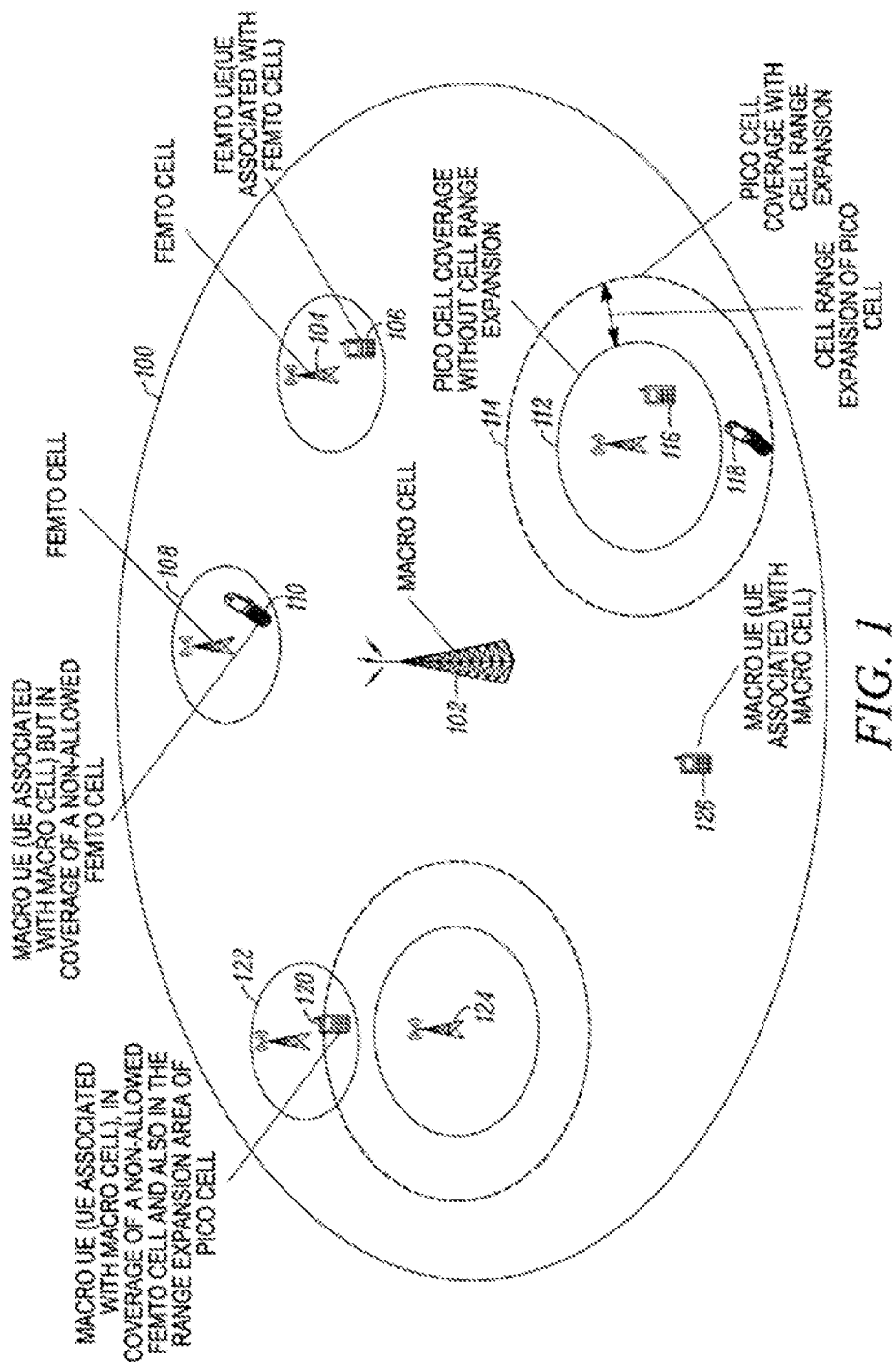
FIG. 1 illustrates a prior art Heterogeneous network comprising macro cells, pico cells and femto cells.

Femto cells are generally used in homes and offices and their precise location and configuration is not entirely under the network operator's control. For example, two femto cells located in nearby homes can have the same physical layer cell identifier (PCID). A femto cell can be a restricted access cell such as a CSG cell. In FIG. 1, a Heterogeneous network 100 comprises a macro cell 102, femto cells 104, 108, 122, pico cells 112, 124 and mobile stations 106, 110, 116, 118, 120, 126. If a UE 110 is not a member of the CSG to which the femto cell 108 belongs, the UE may be unable to access the femto cell. Even if the UE 110 is very close to such a femto cell 108, the UE may be associated with the macro cell. The UE may then experience significant interference to its communication with the macro cell due to transmissions of the femto cell.

Pico cells generally do not restrict access to specific users. However, some operator configurations can allow pico cells to restrict access to certain users. Pico cells are generally fully under the network operator's control and can be used to enhance coverage in locations where the macro cell signal may be inadequate. Furthermore, in order to maximize offloading of users to pico cells, a network operator can have an association bias towards the pico cell. In FIG. 1 for example, a UE 118 may be made to associate with a pico cell even if the pico cell 112 is not the strongest cell at the UE's 118 location. This is referred to as "cell range expansion" of the pico cell. A UE is said to be the cell range expansion area of a pico cell, if it associates with the pico cell only if an association bias is used, and associates with another cell (e.g., a macro cell 102) if the association bias is not used. If a UE 118 is in the cell range expansion area of the pico cell 112 and is associated with the pico cell 112, it can experience significant interference due to transmissions of a neighbor cell (such as a macro cell 102).

In order to operate multiple cells with overlapping coverage on a carrier frequency, such as in a heterogeneous network 100 in FIG. 1, it is necessary to have coordination between the cells so that the transmissions don't interfere with one another. LTE heterogeneous networks will use time division techniques to minimize interference. Specifically, a cell can be configured with patterns of subframes during which it does not schedule user data. Such subframes are referred to as "blank subframes". Furthermore, it may be necessary to transmit some critically important information in all subframes. For example, it may be necessary to transmit cell-specific reference symbols (CRS) to enable UEs to perform measurements during the subframe. It may also be necessary to transmit primary and secondary synchronization signals (PSS and SSS), primary broadcast channel (PBCH) and System Information Block 1 (SIB1), Paging Channel and the Positioning Reference Signal (PRS). Such information is essential for proper operation of functions such as cell search and maintenance of up-to-date system information. Blank subframes which are not used for scheduling data but can be used for transmission of a restricted set of information (such as the critically important information described above) are referred to as "almost blank subframes" (AB subframes). In LTE AB subframes of a base station, the base station can be configured to not transmit any energy on all resource elements, except for resource elements used for (a) CRS, (b) PSS and SSS, (c) PBCH, (d) SIB1, and (e) paging messages.

Figure 2:
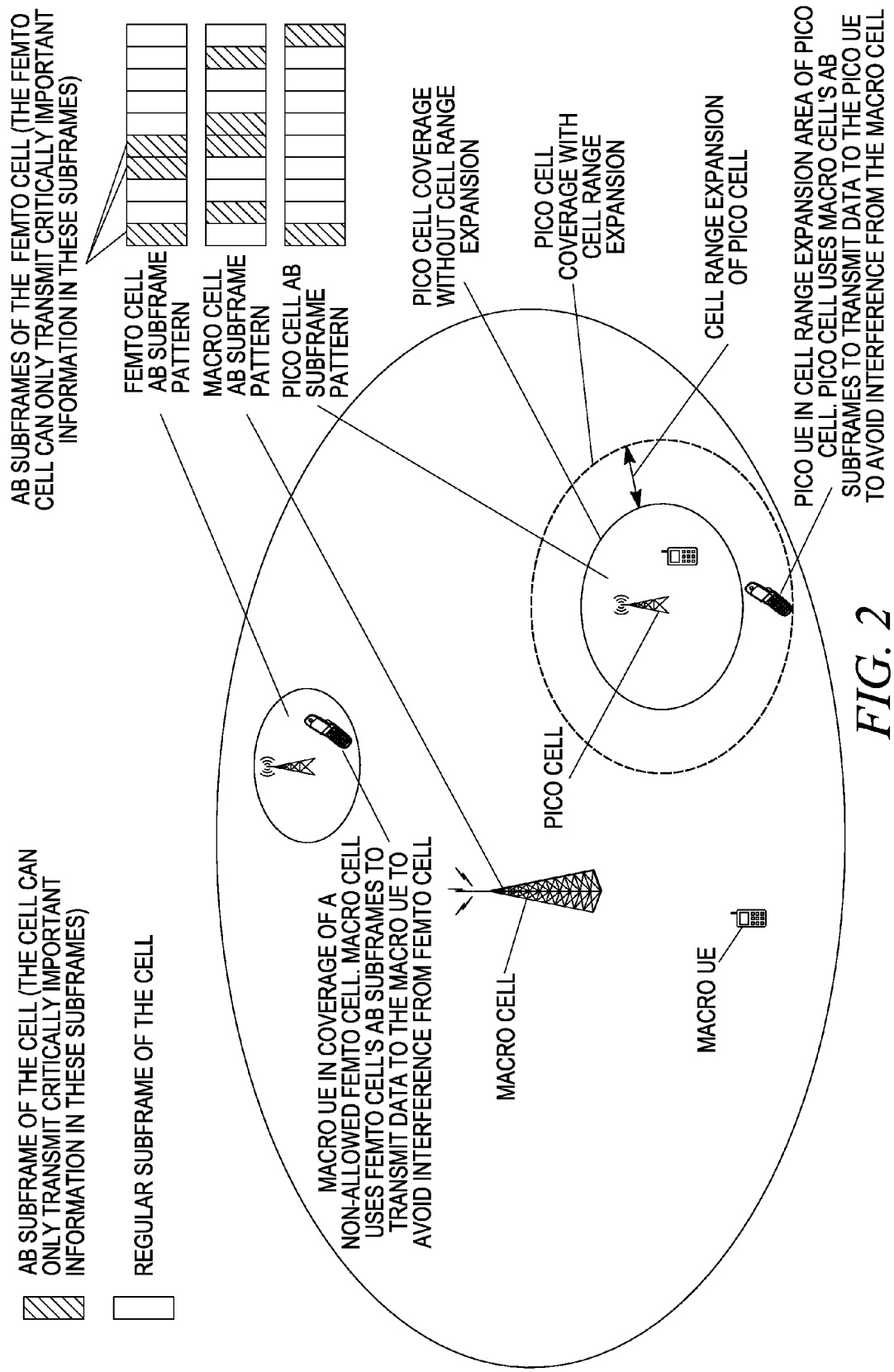
FIG. 2 illustrates the application of almost blank subframes for scheduling UEs in a heterogeneous network.

AB subframes of one cell can be used by a neighboring cell to schedule UEs. FIG. 2 illustrates the use of AB subframes. For example, each of a femto cell, a macro cell and a pico cell can be configured with an AB subframe pattern. The patterns can be such that the AB subframes of different cells can overlap. Alternatively the patterns can be mutually exclusive, so that AB subframes of two cells do not overlap. Also, some cells may not be configured with an AB subframe pattern. As indicated above, a cell can be configured to only transmit critically important information during its AB subframes.

The use of AB subframe patterns is described further below. A macro UE may be in the coverage of a non-allowed femto cell, such as a CSG cell whose CSG the UE is not a member. In FIG. 1, UE 110 represents such a UE and femto cell 108 represents such a femto cell. Such a macro UE can experience interference from the femto cell, making communication between the macro UE and the macro cell difficult. To overcome the interference, the macro cell can transmit data to the UE only in the AB subframes of the femto cell. Since the femto cell only transmits critically important signals in the AB subframes, the macro cell can avoid most of the interference from the femto cell and successfully transmit data to the macro UE in the AB subframes of the femto cell.

Similarly, a pico UE may be in the cell range expansion area of the pico cell. In FIG. 1, UE 118 represents such a pico UE and pico cell 112 represents such a pico cell. Such a pico UE can experience a high interference from a neighbor cell, such as macro cell 102), making communication between the pico UE and the pico cell difficult. In order to overcome the interference, the pico cell can transmit data to the UE only in the AB subframes of the macro cell. Since the macro cell only transmits critically important signals in the AB subframes, the pico cell can avoid most of the interference from the macro cell and successfully transmit data to the pico UE in the AB subframes of the macro cell.

When different cells use different patterns of AB subframes, the RRM, RLM and CSI measurements performed by UEs in the heterogeneous network can result in unpredictable and undesirable behavior. UEs perform RLM measurements in connected mode to ensure that the serving cell signal conditions are adequate to schedule the UE. UEs perform RRM measurements to support handovers in connected mode and reselections in idle mode. UE performs CSI measurements to support optimal scheduling by the base station. For example, in FIG. 1, macro UE 110 in the coverage of a non-allowed femto cell 108 may be performing RLM measurements of the macro cell 102 signal. Due to interference from the femto cell 108 in subframes during which the femto cell schedules (i.e., not the AB subframes of the femto cell), the macro UE can conclude that the radio link between the macro cell and the macro UE has failed. The UE can make such a conclusion even if it can be successfully scheduled by the macro cell during the AB subframes of the femto cell.

Similarly, in FIG. 1, the macro UE 110 in the coverage of a non-allowed femto cell 108 may be performing RRM measurements of the serving cell and neighbor cells. Due to interference from the femto cell, the UE may measure a low value the macro cell signal level and transmit a measurement report indicating the low value to the network. As a result of the measurement report, the network can perform a handover of the UE to another frequency or to another radio access technology, such as UMTS or GSM. This is an undesirable outcome, as the UE can be successfully scheduled by the macro cell in the femto cell's AB subframes.

Similarly, in FIG. 1, the macro UE 110 in the coverage of a non-allowed femto cell 108 may be performing CSI measurements of the serving cell. Due to interference from the femto cell, the UE may measure a low value of the macro cell's channel quality and transmit a low value of channel quality indication (CQI) to the network. As a result of the low value of CQI, the base station can avoid scheduling the UE or transmit a very small amount of data to the UE. Thus, the data rate experienced by the UE is reduced, although it may be possible to maintain a high data rate for the UE by scheduling during the femto cell's AB subframes.

Similar observations can be made for pico UEs. In FIG. 1, for example, a pico UE 118 in the coverage expansion area of a pico cell 112, can conclude that the radio link between the pico UE and the pico cell has failed due to interference from the macro cell 102. The pico UE 118 in the coverage expansion area of a pico cell 112, can report low measured values for the pico cell signal level and high measured values for the neighboring cell signal levels, resulting in a handover away from the pico cell. In order to overcome these problems, it is necessary to restrict measurements performed by the UE to certain subframes.

Given that different cells can be configured with different AB subframe patterns, methods are needed for determining which subframes should be used by a UE to perform various measurements under different scenarios. In the foregoing, the embodiments described in the context of AB subframes. However, it should be clear that the same methods are applicable to blank subframes and subframes that are only partially used for scheduling. That is, subframes in which only some of the time-frequency resources are used for scheduling. In the context of the disclosure, measurements can include, but are not limited to, one or more of (a) measurements required to perform cell identification, (b) RRM measurements such as RSRP and RSRQ measurements of cells detected by the UE, (c) measurements required for performing radio link monitoring, or (d) channel state measurements, such as measurements needed for performing channel state information reporting and channel quality indication reporting.

According to a first embodiment, the UE ranks cells in decreasing order of signal level. The signal level metric used for the ranking can be Reference signal receive power (RSRP) or any other suitable metric. The UE can then determine the AB subframe pattern corresponding to the strongest cell of the cells ranked in the decreasing order of signal level. The UE can then perform measurements of all cells other than the highest ranked cell in the AB subframes of the highest ranked cell. According to an extension of the first embodiment, the UE can determine the AB subframe pattern corresponding to the second strongest cell of the cells ranked in decreasing order of signal level. The UE then performs measurements of all cells other than the strongest and the second strongest cells in subframes that are AB subframes of both the strongest cell and the second strongest cell.

If the highest ranked cell does not have any AB subframe pattern configured, the UE can either measure the other cells (i.e., cells with rank #2 and higher) on any subframe without restriction. Alternately, the UE can measure cells with rank #3 and higher on the subframes corresponding to the AB subframe pattern of the cell with rank #2 (i.e., a recursive application of step i is used to mitigate interference from the rank #2 cell into measurements of rank #3 and higher cells). The highest ranked cell may not be the serving cell. For example, an association bias may be used to favor association to pico cells, resulting in a serving macro cell of a UE being a lower ranked cell than a nearby pico cell. Similarly, a macro UE may be in the proximity of a non-allowed femto cell, resulting in the serving macro cell being a lower ranked cell than the non-allowed femto cell.

According to another extension of the first embodiment, the UE can determine the AB subframe pattern of the serving cell. The UE can then perform measurements of all cells other than the strongest cell and the serving cell in subframes that are AB subframes of both the strongest cell and the serving cell.

Figure 3:
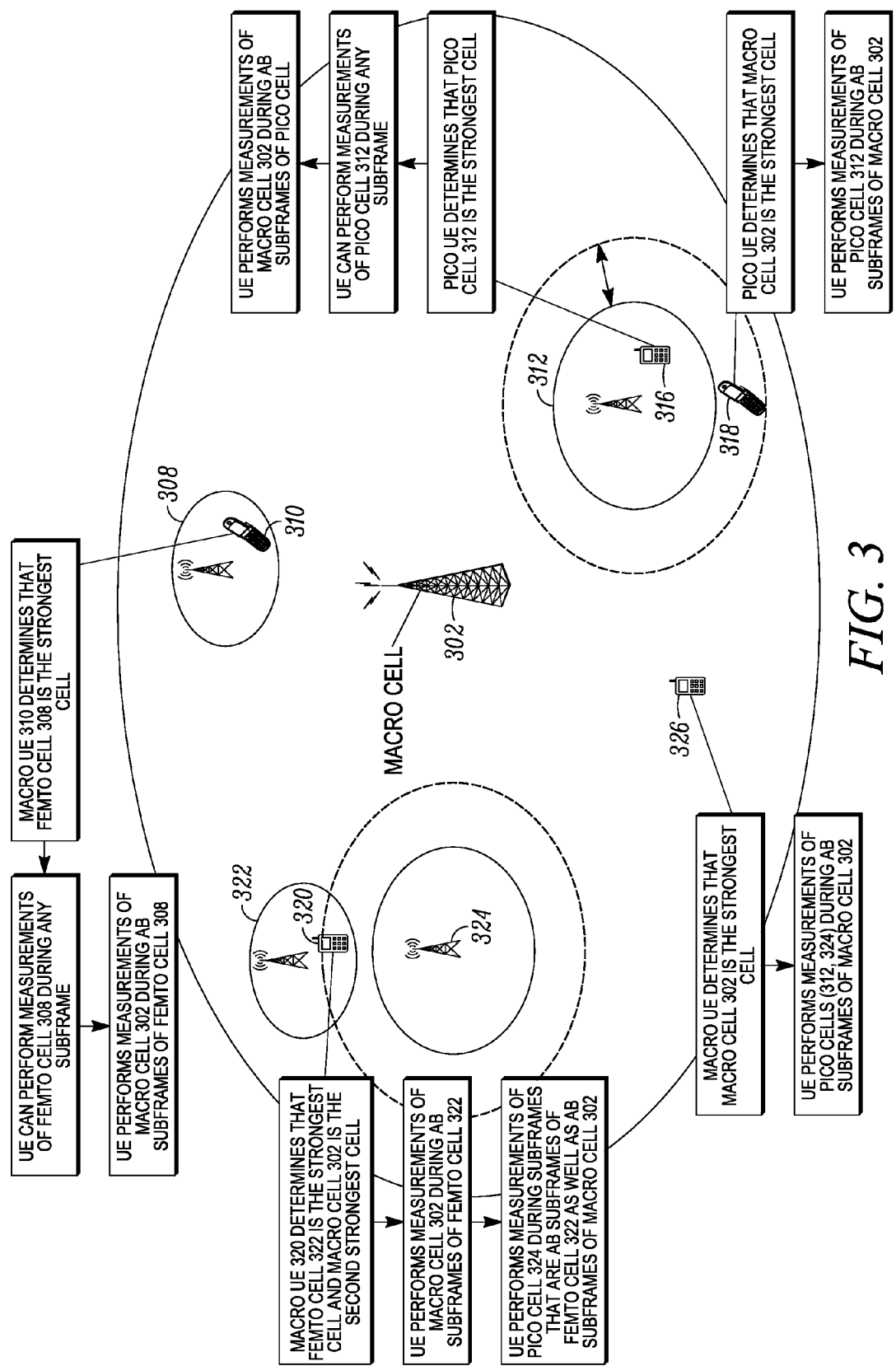
FIG. 3 illustrates a first scenario.

In FIG. 3, the UE can rank multiple cells by signal level. The signal level metric used for the ranking can be reference symbol receive power (RSRP) or any other suitable metric. Depending on the metric used, the ranking can be in decreasing order or increasing order of the metric used. The UE can then determine the AB subframe pattern corresponding to the highest ranked cell of the cells ranked by signal level. The UE can then perform measurements of all cells other than the highest ranked cell in the AB subframes of the highest ranked cell. For example, a macro UE 310 may be in the coverage of a non-allowed femto cell 308. The UE can rank multiple cells in decreasing order of reference symbol receive power (RSRP). Based on the ranking, the UE may determine that the femto cell 308 is the highest ranked cell. Based on this determination, the UE may determine time periods that are the AB subframes of the femto cell 308 and use only the determined time periods for performing measurements of the macro cell 302. The UE can perform measurements of the non-allowed femto cell 308 without any time period restrictions. That is, the UE can use any subframes to perform measurements of the non-allowed femto cell 308.

According to another example, in FIG. 3, a macro UE 326 can rank multiple cells in decreasing order of reference symbol receive power (RSRP). Based on the ranking, the UE may determine that the macro cell 302 is the highest ranked cell. Based on this determination, the UE may determine time periods that are the AB subframes of the macro cell 308 and use only the determined time periods for performing measurements of all neighbor cells including any pico cells, such as cells 312, 324, and any femto cells, such as cell 308). Furthermore, the UE can perform measurements of the macro cell 302 without any time period restrictions.

According to another example, a macro UE 320 may be in the coverage of a non-allowed femto cell 322 and also in the range expansion area of a pico cell 324. In such a situation the macro UE 320 may be experiencing severe interference from the femto cell 322 and may experience very low data rate and degraded service on its link to the macro cell 302, due to the interference. Consequently, it may be beneficial to associate the UE 320 with the pico cell 324, instead of being associated with the macro cell 302. The UE can rank multiple cells in decreasing order of reference symbol receive power (RSRP). Based on the ranking, the UE may determine that the femto cell 322 is the highest ranked cell and the macro cell 302 is the second highest ranked cell. Based on this determination, the UE may determine the time periods that are the AB subframes of the femto cell 322 and use only the determined time periods for performing measurements of the macro cell 302. Furthermore, the UE may determine the time periods that are AB subframes of both the femto cell 322 and the macro cell 302 and use only the determined time periods for performing measurements of all cells other than the femto cell 322 and the macro cell 302. For instance, the UE can use only the time periods that are AB subframes of both the femto cell 322 and the macro cell 302 to perform measurements of the pico cell 324. The UE can perform measurements of femto cell 322 without any time periods restrictions.

According to another example, a pico UE 318 may be in the range expansion area of the serving pico cell 312. In such a situation, the pico UE 318 may be experiencing interference from the macro cell 302. The UE can rank multiple cells in decreasing order of RSRP. Based on the ranking, the UE may determine that the macro cell 302 is the highest ranked cell. Based on this determination the UE may determine the time periods that are the AB subframes of the macro cell 302 and use only the determined time periods for performing measurements of the pico cell 312. The UE can perform measurements of the non-allowed macro cell 302 without any time period restrictions. Similarly, a pico UE 316 may be in the regular coverage area of the pico cell 312 (that is in the coverage of the pico cell while not being in the range expansion area of the pico cell). The UE can rank multiple cells in decreasing order of RSRP. Based on the ranking, the UE may determine that the pico cell 312 is the highest ranked cell. Based on this determination, the UE may determine the time periods that are the AB subframes of the pico cell 312 and use only the determined time periods for performing measurements of the macro cell 302. The UE can perform measurements of pico cell 312 without any time periods restrictions.

Additionally, the difference in signal levels between the ranked cells can be used to determine whether the UE should perform measurements of certain cells only in certain time periods. If UE does not observe a large signal level difference between the highest ranked cell and the second highest ranked cell, the UE may be able to perform measurements of the second highest ranked cell without any time restrictions. For example, the UE can perform measurements of the second highest ranked cell in the AB subframes of the highest ranked cell, only if the difference in the signal level between the highest ranked cell and the second highest ranked cell exceeds a threshold. The UE can perform measurements of the second highest ranked cell without any time restrictions, if the difference in the signal level between the highest ranked cell and the second highest ranked cell does not exceed the threshold. The threshold used to determine whether to use the AB subframes of the highest ranked cell can be preconfigured in the UE or it can be signaled to the UE by the network. Similar observations can be made regarding measurements of the lower ranked cells. For example, the UE can perform measurements of the third highest ranked cell during the subframes that are both AB subframes of the highest ranked cell and the AB subframes of the second highest ranked cell, only if the difference in signal level between the second highest ranked cell and the third highest ranked cell exceeds a second threshold. The UE can perform measurement of the third highest ranked cell during the AB subframes of the highest ranked cell if the difference in signal level between the second highest ranked cell and the third highest ranked cell does not exceed the second threshold.

According to a second embodiment, a UE changes the AB subframe pattern used for measurements, due to mobility. The UE can first use an AB subframe pattern corresponding to a first cell. The first cell can be the strongest cell. It can then determine, at a later time, that certain conditions require a second AB subframe pattern to be used for measurements. The conditions that require a second AB subframe pattern can include, for example, a determination by the UE that it is near a second cell. The UE can switch from performing measurements using the AB subframe pattern corresponding to the first cell to the second AB subframe pattern, if the signal level of the second cell is higher than the signal level of the first cell by a specified amount. This ensures that UE does not rapidly switch between the AB subframe pattern of the first cell and the second AB subframe pattern, therefore avoiding inconsistent measurements and undesirable consequences.

Figure 4A:
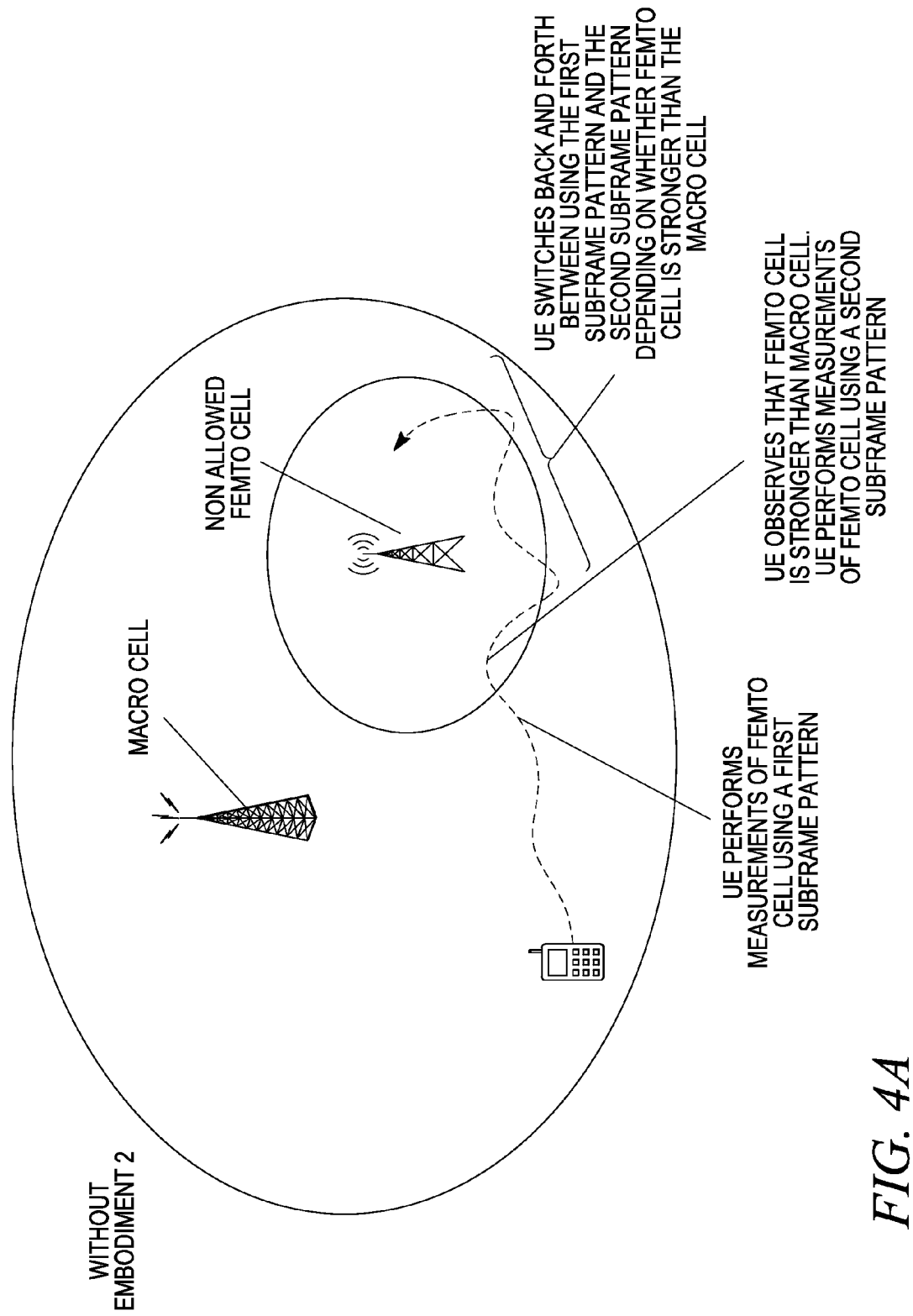
FIGS. 4A and 4B illustrate a second scenario.
Figure 4B:
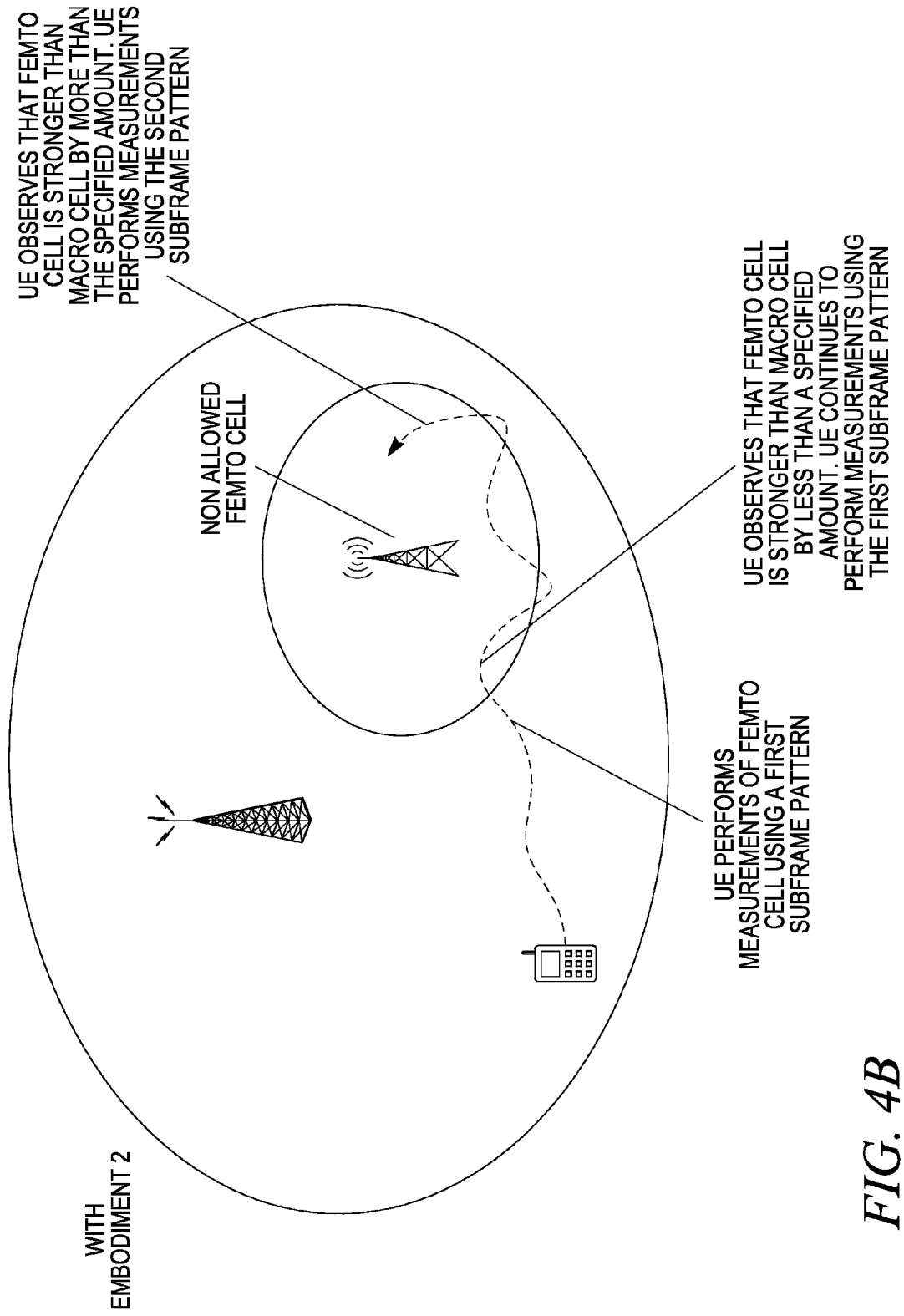

In FIGS. 4A and 4B, a macro UE first performs certain measurements (such as measurements of neighbor cells) using a first subframe pattern. The neighbor cells can include any femto cells, pico cells or other macro cells that the UE can detect. The first subframe pattern can correspond to the AB subframe pattern of the macro cell, or any other suitable subframe pattern. The UE may roam into the coverage of a femto cell. If the UE remains near the edge of the femto cell, it may naturally switch between performing measurements using the first subframe pattern and a second subframe pattern depending on the signal level of the femto cell, and this switching between subframe patterns can lead to inconsistent measurements and undesirable consequences. In order to avoid the problems associated with such switching, the UE can delay the switching from the first subframe pattern to the second subframe pattern. For example, the UE can determine whether the femto cell signal level is higher than the macro cell signal level by at least a specified amount. If the UE determines that the femto cell signal level is higher than the macro cell signal by at least the specified amount, then it can switch from performing certain measurements using the first subframe pattern to performing the certain measurements using the second subframe patterns. If the UE determines that the femto cell signal level is not higher than the macro cell signal by at least the specified amount, it can continue to perform certain measurements using the first subframe pattern. Similar principles can be used when the UE roams away from femto cell coverage. That is, the UE can switch between subframe patterns used for certain measurements if the macro cell signal level is at least a specified amount higher than the femto cell signal level.

According to a third embodiment, a UE changes the AB subframe pattern used for measurements, due to mobility. In some scenarios, the AB subframe pattern can change rapidly. For example, a moderately fast moving UE can transit through multiple cells in quick succession. Due to being in the coverage of different cells in a short period of time, the UE may switch between multiple AB subframe patterns. This can result in inconsistent measurements and undesirable consequences. The UE can indicate the AB subframe pattern which was used for performing the measurement reported in a measurement report. If the AB subframe pattern used for performing the measurement corresponds to a certain cell, the UE can indicate a cell identifier of the certain cell to indicate the AB subframe pattern that was used. Alternatively, the UE can indicate as a bitmap the AB subframe pattern used or an index associated with a bit pattern from a pre-determined set of ABSF bit patterns.

Figure 5A:
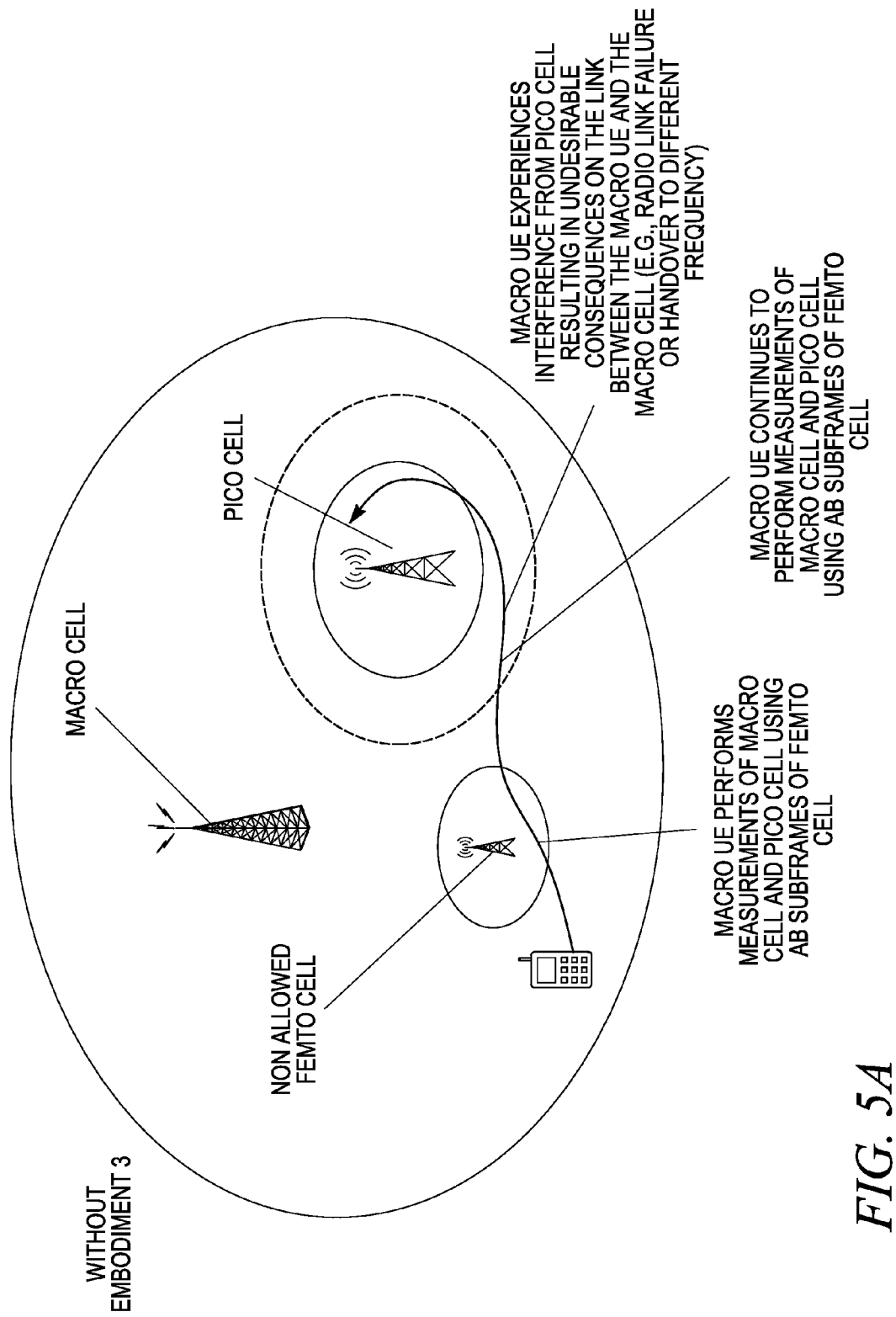
FIGS. 5A and 5B illustrate a third scenario.
Figure 5B:
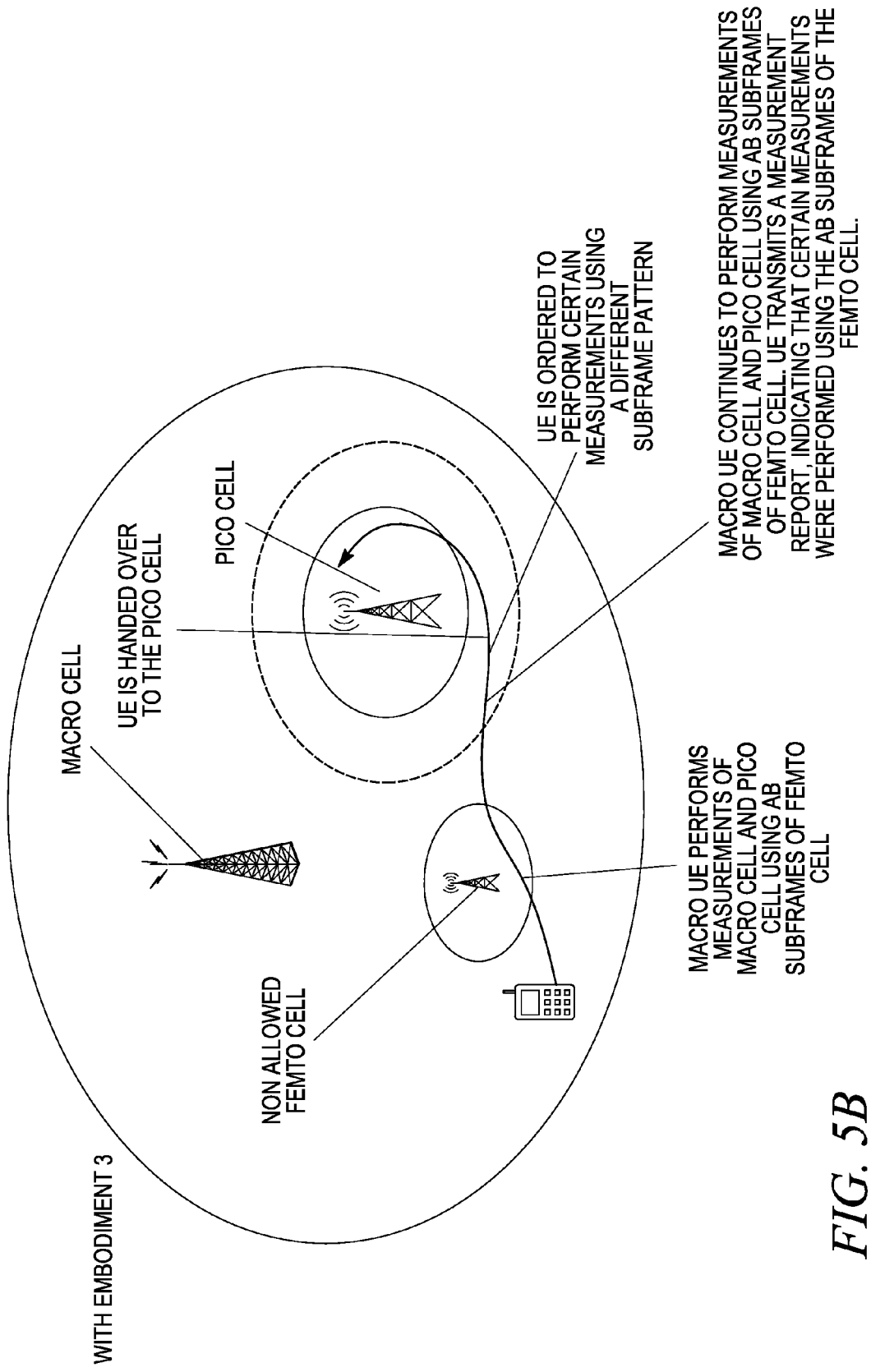

In FIGS. 5A and 5B, a macro UE roams into the coverage of a femto cell. Subsequent to roaming into the coverage of the femto cell, the UE performs certain measurements using a first subframe pattern. The certain measurements can include measurements of the serving macro cell and any detectable pico cells. The first subframe pattern can comprise the AB subframe pattern corresponding to the femto cell. The UE can then roam out of the coverage of the femto cell and into the range expansion area of a pico cell. The UE may however continue to perform the certain measurements using the first subframe pattern, even after roaming out of the coverage area of the femto cell. For example, upon roaming out of the coverage of the femto cell, the UE may need to be configured by the network to use a different subframe pattern for measurements. The network can use measurement reports from the UE to configure the different subframe pattern. However, there can be delay in the triggering of measurement reports. This can lead to the UE continuing to use the first subframe pattern for certain measurements even upon roaming out of the coverage of the femto cell. As a consequence of using the first subframe pattern for certain measurements even upon roaming out of the coverage of the femto cell, the UE can experience several undesirable consequences. For example, the UE may be unable to detect any pico cells in the vicinity, due to the interference from the macro cell in the subframes comprising the first subframe pattern. Thus the UE may not be handed over to such pico cells. The UE may also experience significant interference from such pico cells and experience weak radio conditions on the link between the UE and the macro cell, which can result in a radio link failure or a handover of the UE to a different frequency.

In order to overcome the above problems, the UE can indicate the subframe pattern used for some or all measurements. For example, when in the coverage of the femto cell, the UE can transmit measurement reports including measurements of the macro cell, the femto cell and any detectable pico cells. The UE can indicate that the measurements of the macro cell and the detectable pico cells were performed using the first subframe pattern. When the UE roams out of the coverage of the femto cell, it can transmit measurement reports including measurements of the macro cell and any detectable pico cell. The UE can indicate that the measurements of the macro cell and the detectable pico cells were performed using the first subframe pattern. The network can configure a second subframe pattern for certain measurements. The second subframe pattern can correspond to an AB subframe pattern of a pico cell whose coverage (or cell range expansion area) the UE resides. The certain measurements can include measurements of the pico cell and the macro cell. The UE can send measurement reports including measurements of the pico cell and macro cell, performed using the second subframe pattern. The network can then observe that the UE is within the coverage (or cell range expansion area) of the pico cell and perform a handover of the UE to the pico cell.

Another embodiment is described below to overcome the data throughput limitations that arise from using AB subframes in heterogeneous networks. Given that pico cells and femto cells cannot use AB subframes to schedule regular data for UEs, there can be a significant impact to the data throughput experienced by the UEs. In order to remedy this problem, a pico cell or femto cell can use different AB subframe patterns based on its location, load or environment. For example, if a femto cell is close to a macro cell, it can be configured to use an AB subframe pattern that comprises very few AB subframes. This enables the femto cell to schedule more users and maintain a high throughput. Given that the femto cell is close the macro cell, high data rates and consequently a high throughput can be achieved for macro UEs that are in the coverage of the femto cell, during the femto cell's AB subframes. Conversely, a femto cell that is far from a macro cell can be configured to use an AB subframe pattern that comprises a large number of AB subframes. Similar principles can be applied to pico cells. A femto cell can autonomously modify the AB subframe pattern used (for example, by employing a downlink receiver or location determination functionality), or it may be configured by a different network entity to use a different AB subframe pattern. Change of the AB subframe pattern used by the femto or pico cell can also be based on other factors such as load in the macro cell and time of the day.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A mobile station configured to be connected to a serving base station comprising:
   a processor;
   a transceiver coupled to the processor,
   the processor configured to determine a first almost blank (AB) subframe pattern including a first set of AB subframes during which a neighboring base station is only allowed to transmit a restricted set of information;
   the processor configured to determine a second AB subframe pattern including a second set of AB subframes during which a second neighboring base station is only allowed to transmit a second restricted set of information;
   the processor configured to switch from performing measurements of signals of the serving base station using the first AB subframe pattern including the first set of AB subframes to performing measurements of signals of the serving base station using the second AB subframe pattern including the second set of AB subframes, if a signal level of the second neighboring base station is higher than a signal level of the neighboring base station;
   the processor configured to cause the transceiver to transmit a measurement report including at least the measurements of signals of the serving base station; and
   the processor configured to indicate that the measurements of signals of the serving base station were performed using at least one of the first AB subframe pattern including the first set of AB subframes and the second AB subframe pattern including the second set of AB subframes.

2. The mobile station according to claim 1, wherein the processor is configured to indicate that the measurements of the signals of the serving base station were performed during the first AB subframe pattern including the first set of AB subframes includes indicating the first set of AB subframes in a bitmap.

3. The mobile station according to claim 1, wherein the processor is configured to indicate that the measurements of the signals of the serving base station were performed during the first AB subframe pattern including the first set of AB subframes by indicating that the measurements of the signals of the serving base station were performed during time periods in which the neighboring base station is scheduled to transmit only the restricted set of information.

4. The mobile station according to claim 3, wherein the processor is configured to indicate that the measurements of the signals of the serving base station were performed during time periods in which the neighboring base station is scheduled to transmit only the restricted set of information comprises identifying the neighboring base station by:

signaling a cell identity of the neighboring base station; or signaling an index corresponding to the neighboring base station, wherein the index uniquely identifies the neighboring base station.

5. A method in a mobile station connected to a serving base station, the method comprising:

determining a first almost blank (AB) subframe pattern including a first set of AB subframes during which a neighboring base station is only allowed to transmit a restricted set of information;

determining a second AB subframe pattern including a second set of AB subframes during which a second neighboring base station is only allowed to transmit a second restricted set of information;

switching from performing measurements of signals of the serving base station using the first AB subframe pattern including the first set of AB subframes to performing measurements of signals of the serving base station using the second AB subframe pattern including the second set of AB subframes, if a signal level of the second neighboring base station is higher than a signal level of the neighboring base station;

transmitting a measurement report including at least the measurements of signals of the serving base station; and indicating that the measurements of the signals of the serving base station were performed using at least one of the first AB subframe pattern including the first set of AB subframes and the second AB subframe pattern including the second set of AB subframes.

6. The method according to claim 5, wherein indicating that the measurements of the signals of the serving base station were performed during the first AB subframe pattern including the first set of AB subframes includes indicating the first set of AB subframes in a bitmap.

7. The method according to claim 5, wherein indicating that the measurements of the signals of the serving base station were performed during the first AB subframe pattern including the first set of AB subframes includes:

indicating that the measurements of the signals of the serving base station were performed during time periods in which the neighboring base station is scheduled to transmit only the restricted set of information.

8. The method according to claim 7, wherein indicating that the measurements of the signals of the serving base station were performed during time periods in which the neighboring base station is scheduled to transmit only the restricted set of information comprises identifying the neighboring base station by:

signaling a cell identity of the neighboring base station; or signaling an index corresponding to the neighboring base station, wherein the index uniquely identifies the neighboring base station.

* * * * *